July 11, 1950      C. E. HAWK ET AL      2,515,085
NOZZLE VALVE
Filed Nov. 18, 1946      2 Sheets-Sheet 1
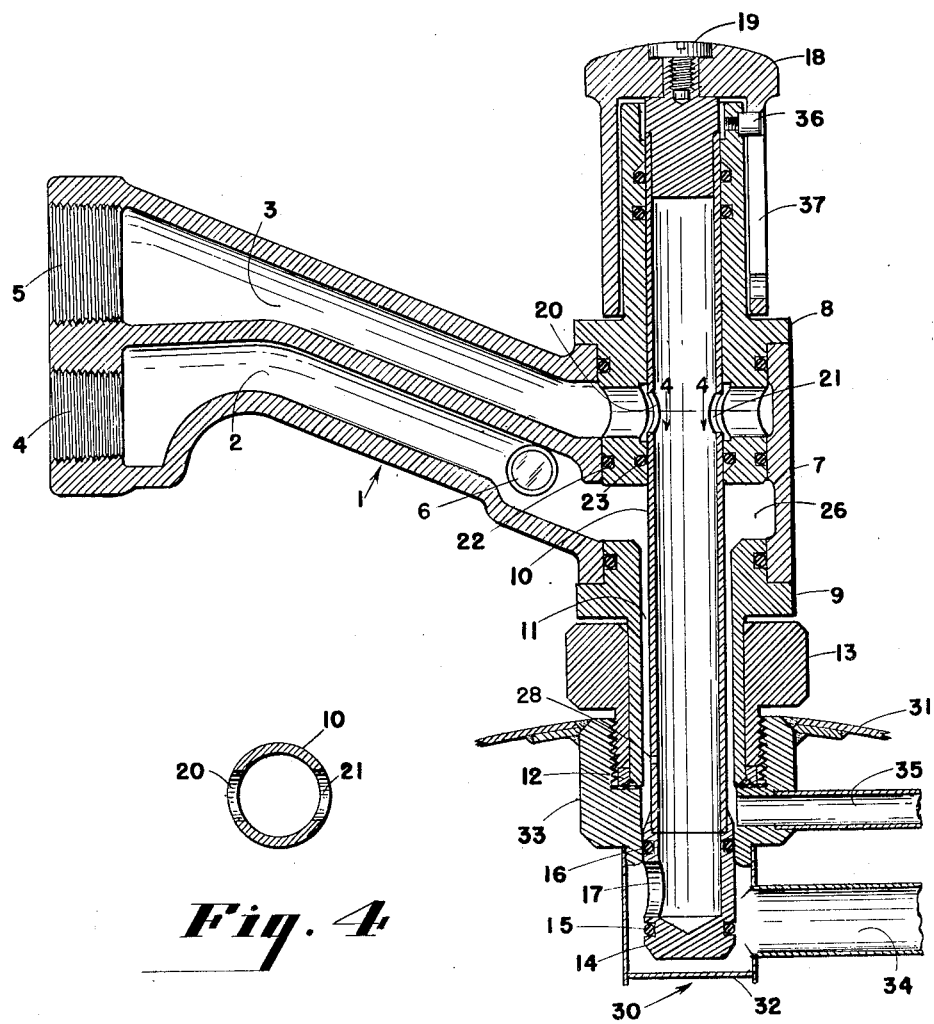
Fig. 1
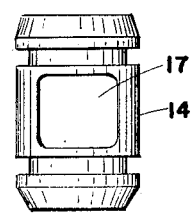
Fig. 4
Fig. 3
INVENTOR.
CARSON E. HAWK
KENNETH J. WALKER
BY
Christie and Angus
ATTORNEYS July 11, 1950 C. E. HAWK ET AL 2,515,085
NOZZLE VALVE Filed Nov. 18, 1946 2 Sheets-Sheet 2

INVENTOR.
CARSON E. HAWK
KENNETH J. WALKER
BY Christie and Angus
ATTORNEYS

Patented July 11, 1950

2,515,085

UNITED STATES PATENT OFFICE 2,515,085

NOZZLE VALVE

Carson E. Hawk, Glendale, and Kenneth J. Walker, Temple City, Calif., assignors to Aerojet Engineering Corporation, Azusa, Calif., a corporation of Delaware Application November 18, 1946, Serial No. 710,524

7 Claims. (Cl. 226—119)

This invention relates to filling systems and has for its object to provide a nozzle valve which can be used in a closed filling system.

It is a common practice to fill tanks and receptacles through a filling conduit forming a nozzle. In many cases, especially when the tank is being filled with dangerous or corrosive fluids, damage may result from the fact that some of the fluid will splash out through the vent or overflow from the tank or will leak or run out from the filling nozzle or tank when it is removed.

In United States Patent 2,401,124 issued to Kenneth James Walker and Carson E. Hawk, a valve is shown which is capable of overcoming many of these difficulties.

In many instances, however, and particularly in the case of airplane gas tanks, it is desirable to be able to fill the tank from the bottom thereof, that is, by upward injection, while avoiding the undesirable overflowing, spilling and splashing or the like.

In accordance with our present invention, we provide a valve which is an improvement over the valve of patent 2,401,124, and is capable of filling a tank from any desired tank location, either top or bottom or at the side, without the undesired spilling, splashing or overflowing the tank.

The above contemplated object is accomplished according to our invention by the provision of a nozzle or valve provided with a charging system and an automatic venting system, sealed from each other but associated together in the single valve body. In conjunction with the aforementioned system, there is provided within the valve structure means whereby both may be simultaneously sealed from the tank to be filled and from the supply and vent lines associated with the valve.

For the filling of tanks by upward injection, there is provided in conjunction with and in addition to the above described valve a receptacle member to be permanently affixed to the tank. This receptacle member is provided with outlet and inlet lines projecting therefrom to appropriate positions within the tank, as hereinafter more fully disclosed, and suitably affixed to the valve receptacle so as to function in cooperative relationship with the corresponding systems within the valve itself upon the insertion of the latter into the receptacle.

As an alternative adaptation of the valve recepacle and the valve inserted therein, they may both be left in association with the tank. In such instance the filling of the tank involves only the attachment of the inlet and vent lines to the valve followed by the normal filling procedure as hereinafter more fully described.

The foregoing and other features, advantages and applications of our invention will be better understood from the following detailed description and the accompanying drawings of which:

Fig. 1 is a cross sectional view of a nozzle valve in association with a valve receptacle in a tank, in accordance with our invention, the nozzle valve being located at the upper side of the tank;

Fig. 3 is a side elevation of the inlet port shown affixed to the lower portion of the slidable sleeve in Figs. 1 and 2.

Fig. 4 is a section view taken along the line 4—4 of Fig. 1; and

Figure 2:
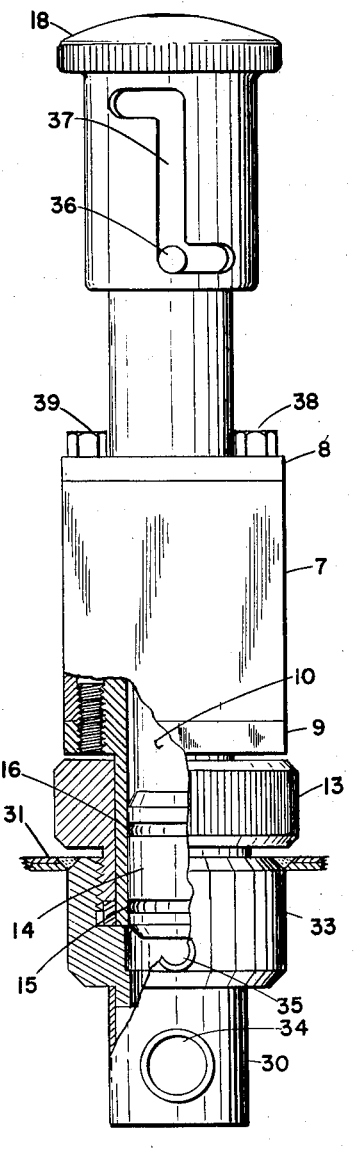
Fig. 2 is a front elevation of the valve partly in section with the controlling tap member in the position it assumes when the valve is closed.

The valve shown in Fig. 1 comprises a body portion 1 containing two passageways 2 and 3, leading from inlet couplings 4 and 5 respectively through the valve. Suitable tubes are adapted to be connected to the couplings 4 and 5 from the fluid supply tank.

The valve of body 1 comprises, in addition to the two passageways 2 and 3, the housing member 7, from which there projects in either direction at right angles to the line of entry of the passageways 2 and 3 into the housing 7, tubular members 8 and 9, the tubular member 9 being of somewhat larger inside dimension than the tubular member 8. A slidable sleeve 10 is disposed within the valve traversing the interior thereof from the upper tubular member 8 through the housing 7 and through the lower tubular member 9. By virtue of the fact that the inside dimensions of the lower tubular member 9 are somewhat larger than the inside dimensions of the member 8, the slidable sleeve 10 forms with the upper member 8 a snug seal; and forms with the lower member 9 an annular space 11 utilized as hereinafter set forth. The lower member 9 terminates in a flange 12 upon which is supported the holding ferrule 13. The ferrule 13 terminates at its lower end in suitable threading adapted to engage the corresponding threading in a liquid storage tank or in the receptacle member of the invention hereinafter described.

At the lower end of the slidable sleeve 10 there is affixed a tubular member 14 of somewhat larger external dimensions than the sleeve 10 so that the member 14 will, on being retracted within the tubular member 9, engage the walls thereof to form an effective seal aided by the compression gaskets or O rings 15 and 16. As shown in Fig. 1, the slidable sleeve 10 is in such a position as to place the member 14 below the bottom end of the tubular member 9 so as to permit the passage of any liquid in the tubular sleeve 10 out the port 17 in the member 14. It is also apparent that if the member 14 were retracted within the tubular member 9, the gaskets 15 and 16 would form an effective seal preventing the passage of any liquid out the port 17.

At the upper end of the valve, i. e. superimposed over the upwardly extending tubular member 8, there is a cap 18, which comprises a cylindrical member closed at the upper end and enclosing the upper portion of the upwardly extending tubular member 8. The upper end of the tubular sleeve 10 is affixed to the cap 18 by suitable connecting means such as the bolt 19. In Fig. 1, the cap is shown so positioned with relation to the member 8 as to displace the member 14 from the lower end of the member 9. As hereinafter described with relation to Fig. 2, the cap member may be raised so as just barely to enclose the upper portion of the member 8, whereby the tubular sleeve 10 is raised within the valve a corresponding distance and the member 14 containing the port 17 is thereby retracted into the member 9.

Openings 20 and 21 are provided in the tubular member 10 in order to permit the passage of liquid introduced through the passageway 3 into the inside of the sleeve 10; and a circumferential space is provided around the sleeve 10 at the point of entrance of the passageway 3 to permit the free flowing of liquid from the passageway 3 into the sleeve 10. As shown in Fig. 1, the ports 20 and 21 are adjacent the opening of the passageway 3. As above described, the slidable sleeve 10 may be raised from the position shown in Fig. 1 by lifting the cap 18 so as substantially to expose the outer walls of the tubular member 8. If the sleeve 10 is so lifted within the valve, not only will the port 17 be raised or retracted into the member 9, but the ports 20 and 21 will be retracted into the member 8 preventing the passage of any liquid from the passageway 3 into the tube 10. Further, by the provision of the O-rings 22 and 23, the passage of any liquid downwardly into the annular space 11 or into the companion passageway 2 is likewise prevented. At the point of entrance of the passageway 2 into the housing 7, there is provided a circumferential space 26 to permit the free flow of fluid from the annular space 11 into the passageway 2. In this way the fluid flows from the tank upon completion of the filling thereof through the annular space 11 by virtue of the opening provided at the lower part of the valve when the member 14 is displaced from in the tubular member 9, and then into passageway 2.

In Fig. 1 there is also shown a companion receptacle member 30 which may be affixed within the tank wall 31. The receptacle 30 comprises a housing 32 affixed to a threaded member 33 which is in turn attached to the tank wall 31. The tubular member 10 and the member 14 attached thereto will extend into member 30 when the cap 18 is in the position shown in Fig. 1.

Inlet line 34 and vent line 35 are provided entering receptacle member 30 whereby fluid entering the free space in the housing 32 from the port 17 in the member 14 may flow through suitable ports or holes provided in the inlet line 34, and excess fluid in the tank, after the filling operation is complete, will flow through the vent line 35 into the annular space 11 and out the passageway 2 as hereinbefore described.

In Fig. 2 the valve is shown in front elevation and there may be seen the housing 7, the two cylindrical members 8 and 9 projecting therefrom, the holding ferrule 13 and the threaded portion 33 of the receptacle member 30. The tubular extensions 8 and 9 are attached to the housing 7 by the bolts 38 and 39 which project from the flanged portion of the tubular member 8 through the housing 7 into the flanged portion of the tubular member 9.

In Fig. 2 the cap 18 is shown in its upper position at the upper end of the tubular member 8, exposing the greater portion of that member to view. A pin 36 projects from the tubular member 8 and the cap 18 is provided with a groove 37 adapted to engage the pin 36. Thus in Fig. 1 it is seen that the cap 18 has been forced downwardly and the pin 36 is in engagement with the upper horizontal section of the groove 37. In Fig. 2 the cap has been raised and the pin 36 is engaging the lower portion of the groove 37. By rotating the cap 18 in Fig. 2 in a clockwise direction, the groove 37 will be displaced in such a fashion that pin 36 will engage the outer extremity of the lower horizontal portion of the groove 37 and will prevent downward motion of the cap 18 until the same is rotated in counterclockwise motion to permit the pin 36 to ride in the vertical portion of the groove 37.

In Fig. 3 there is shown a side elevation of the member 14 provided with the port 17, the member on either side of the port 17 being recessed to provide space for the gaskets 15 and 16 as illustrated in Fig. 1. The lower end of the tubular sleeve 10 fits into the upper end of the member 14 as shown in Fig. 1.

In Fig. 4 there is shown a sectional view taken on the line 4—4 of Fig. 1 showing the ports 20 and 21 in the tubular sleeve 10.

Figure 5:
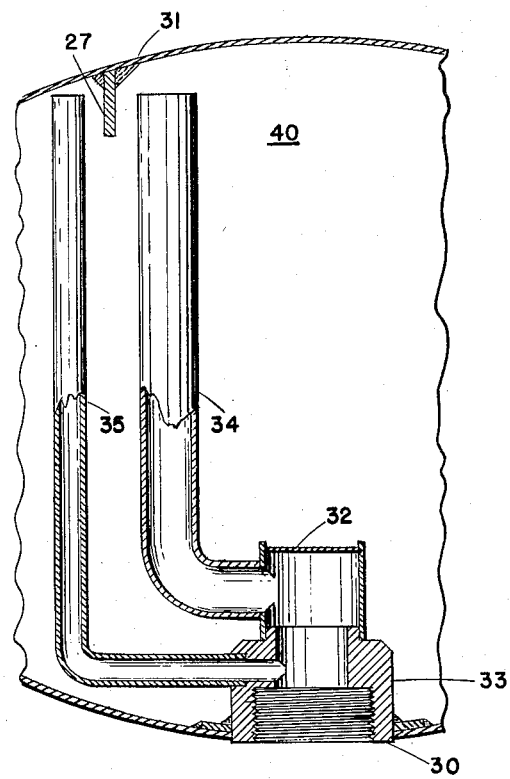
Fig. 5 is a sectional view of a liquid storage tank, illustrating an arrangement of inlet and vent lines arranged at the under side of the tank for bottom filling and their relationship to the valve receptacle member affixed to the tank bottom.

In Fig. 5 there is shown a cross sectional view of a liquid storage tank 40 with the receptacle member 30 disposed therein in a position ready for usage in the filling of the tank 40. Projecting from the housing 32 is the inlet line 34 which is extended to a point relatively close to the top of the tank 40. The height of the inlet line 34 in the tank 40 will of course control the level to which the tank may be filled. Projecting also from the receptacle member 30 is the vent line 35 which is likewise extended to a position relatively close to the upper wall of the tank but short of the point to which the inlet line 34 is extended. A baffle 27 attached to the upper wall 31 of tank 40 projects between the inlet line 34 and the vent line 35 and serves to prevent the fluid coming from line 34 from splashing in the vent line 35 before the tank is filled.

In the filling by upward injection of a liquid storage tank, such as tank 40 shown in Fig. 5, the valve as shown in Fig. 1 is screwed into the receptacle member 30 while the cap is in the raised position shown in Fig. 2, thereby sealing both the outlet and inlet systems from the tank and from the outlet and vent couplings 4 and 5.

After attachment of the nozzle to the receptacle member is complete and after affixing suitable inlet and vent lines from the couplings 4 and 5 of the valve to the liquid supply tank, the cap 18 is released from the pin 36 and pressed downwardly into the position shown in Fig. 1. Suitable pumping means is employed to pump liquid from the supply tank through the coupling 5 to passageway 3, the ports or holes 20 and 21 in the tubular sleeve 10, through sleeve 10 out the port 17 in the member 14 and through suitable holes in the inlet pipe or line 34 to be discharged in the tank 40.

When the tank 40 has filled up to the height of the vent line 35, liquid entering by means of the inlet line 34 will cause liquid to flow through the vent line 35 into the annular space between the tubular sleeve 10 and the cylindrical member 9 from thence into the passageway 2 out the coupling 4 and back through the vent line attached thereto the liquid supply tank or to the inlet of the above-mentioned pumping means as desired. A substantial flow from vent line 35 may be observed through sight glass 6 as shown in Fig. 1. At such time as liquid begins to flow back through the vent line 35, the annular space 11 and the vent passageway 2, the pumping means will be shut off and the flow will be reversed for a brief time, that is, the pump will be so arranged as to produce suction on the line engaged with coupling 5 in communication therefor with the passageway 3. In this fashion, a sufficient volume of liquid will be pumped to withdraw any liquid in the inlet line 34 and in the valve itself.

When the backflow of liquid through the vent portion of the valve has ceased and the inlet line 34 and the valve charging system have been cleaned, the cap 18 can be disengaged from the pin 36 and raised to the position shown in Fig. 2. As above described with relationship to Fig. 1, the raising of the cap 18 will cause the sealing off of both the charging and venting systems of the valve so that the valve may be removed from the receptacle member 30 in completely dry state without occurrence of any leakage, spilling, splashing or the like. If so desired, a plug member may be provided whereby the receptacle 30 may be plugged when the valve is not positioned therein. Alternatively, as above described, the valve may be left engaged with the receptacle member 30 as a permanent fixture to the tank 40.

When the handle 18 is in a raised position, and the valve is closed, there is a possibility, since the fit between tubular member 8 and tubular sleeve 10 is a lap fit, a small amount of fluid leakage may occur from conduit 3 into ports 20 and 21 which may create a pressure within tubular sleeve 10. Such a pressure would tend to build up in case the lap fit leaked appreciably particularly if the pumps were left on. In event O ring 15 was damaged, fluid would escape past it to the atmosphere. To avoid this a small orifice 28 is provided in the wall of member 10 which vents any fluid under pressure into the annular channel 11 permitting it to escape through the return vent conduit 2 and back to the storage tank.

Although the arrangement of Fig. 5 relates particularly to the filling of a tank by upward injection, it will be understood that the present invention is also adapted to the filling of a tank by downward injection, in which case the receptacle member 30 need not be employed. In the downward filling of the tank, the operation will be similar to that described above. The cap, after insertion of the valve in the tank, will be depressed to the position shown in Fig. 1, the pumping means will be started, and fluid will be caused thereby to flow through the passageway 3, the ports 20 and 21, the tubular sleeve 10 and out port 17 in the member 14 into the storage tank. At such time as the level within the storage tank fills up to the vent port of the valve, the pumping means will be stopped. Upon the entrance of fluid into the annular space 11 between the tubular sleeve 10 and the member 9, the pumping means is stopped; the pump is reversed to empty the filling system; and the cap 18 is raised in the manner above described to the position as shown in Fig. 2 whereby the tubular sleeve is raised a corresponding difference retracting the port 17 into the member 9 and withdrawing the ports 20 and 21 from their cooperative relationship with the passageway 3. In this fashion, the valve is effectively sealed from any ingress or egress of liquid and may be safely withdrawn from the tank without the usual dripping or overflow which is often associated with such filling operations.

Although the companion receptacle member 30 may, if desired, be employed in conjunction with the valve in the downward type of filling operation, it is not necessary, and its use is optional.

It will be seen that by our invention we have provided a simple nozzle filler valve which is easily inserted into a tank to be filled and connected in such manner as to create a closed system. Such a nozzle valve permits filling of highly dangerous fluids without endangering the operator. Furthermore, we have provided a valve and auxiliary apparatus which may be employed for either downward or upward injection filling.

A particular advantage of our invention is that the position of the handle gives a visual and absolute indication of whether the valve is open or closed; a feature which is not ordinarily present in the conventional screw type of valve handle. This advantage becomes of great importance when the fluid being handled is of a corrosive or dangerous nature particularly at the time the nozzle is being removed from the tank.

We claim:

1. A fluid injecting device comprising a sectional tubular member provided with means for engaging the receptacle into which said fluid is to be injected, said tubular member being of substantially greater internal dimension throughout a portion of its length terminating in said engaging means than at the other end thereof, a slidable sleeve disposed within said tubular member; said slidable sleeve being proportional to fit snugly within that portion of said tubular member having the smallest dimension and to provide an annular passageway with that portion of said tubular member having the largest dimension, a cylindrical cap member closed at one end and adapted to circumscribe the smaller of said ends of said tubular member in slidable relationship, means for affixing said cap member to said sleeve, a port member affixed to the lower end of said sleeve, said port member being of such external dimensions as to fit snugly within said larger portion of said tubular member when said port member is disposed therein, and means provided with a hole communicating between said tubular sleeve and the atmosphere, said tubular sleeve being provided in addition with a pair of diametrically opposite ports adjacent the point of union of an inlet tube to said tubular member and a vent tube joining said tubular member at a point directly beneath said inlet tube and adapted to communicate with the said annular space between said sleeve and the larger portion of said inlet tube.

2. A fluid nozzle adapted to be fitted to an opening in a receptacle to be filled, comprising a central conduit having an exit port adapted to carry the fluid from said receptacle, a retractable sleeve positioned within said conduit and spaced therefrom to provide an annular passage between the conduit and the sleeve, said annular passage being in communication with said exit port, an inlet port in communication with said conduit, ports provided in said sleeve adapted to be placed in communication with said inlet port, means for preventing the passage of liquid from said annular space to said inlet port and means for retracting said retractable sleeve so as to prevent the passage of liquid from said receptacle into said annular space and from said inlet port into said retractable sleeve.

3. Apparatus for filling with fluid a tank having an inlet tube and a vent tube positioned within said tank, said apparatus comprising means insertable in said tank and adapted to be in communication with the outer opening of said inlet tube and said vent tube, said last named means comprising a valve member comprising a passageway for fluid from a storage tank to said inlet tube and an associated but separate passageway from said vent tube to said storage means, and means for simultaneously shutting off the flow of fluid through each of said passageways, said last-named means comprising a sleeve in said valve, said sleeve being hollow to provide communication between said inlet tube and the storage tank and providing a space around the sleeve providing communication between the vent tube and the storage tank, said sleeve being retractable in the valve so that the wall of the sleeve in cooperation with a wall of the valve shuts off the flow of liquid in said passageways.

4. Apparatus for filling with fluid a tank having an inlet tube and a vent tube positioned within said tank, said apparatus comprising means insertable in said tank and adapted to be in communication with the outer opening of said inlet tube and said vent tube, said last named means comprising a valve member comprising a passageway for fluid to be introduced to said tank, an associated but separate passageway for fluid to be withdrawn from said tank, inlet means in association with the first of said passageways to introduce fluid thereto, outlet means in association with the second of said passageways to withdraw fluid therefrom, and means for simultaneously shutting off the flow of fluid through each of said passageways, said last-named means comprising a sleeve in said valve member, said sleeve being hollow to provide communication between said inlet tube and the storage tank and providing a space around the sleeve providing communication between the vent tube and the storage tank, said sleeve being retractable in the valve member so that the wall of the sleeve in cooperation with a wall of the valve shuts off said flow of fluid in said passageways.

5. Apparatus for filling with fluid a tank having an inlet tube and a vent tube positioned within said tank, said apparatus comprising means insertable in said tank and adapted to be in communication with the outer opening of said inlet tube and said vent tube, said last named means comprising a valve member comprising a central conduit having an exit port adapted to carry said fluid from said receptacle, a retractable sleeve positioned within said conduit and spaced therefrom to provide an annular passage between said conduit and the sleeve, said annular passage being in communication with said exit port, an inlet port in communication with said conduit, ports provided in said sleeve adapted to be placed in communication with said inlet ports, means for preventing the passage of liquid from said annular space to said inlet port and means for retracting said retractable sleeve so as to prevent the passage of liquid from said receptacle sleeve into said annular space and from said inlet port into said retractable sleeve.

6. Apparatus for filling with fluid a tank having an inlet tube and a vent tube positioned within said tank, said apparatus comprising means insertable in said tank and adapted to be in communication with the outer opening of said inlet tube and said vent tube, said last named means comprising a tubular member provided with means for engaging the receptacle into which said fluid is to be injected, said tubular member being of substantially greater internal dimension throughout a portion of its length terminating in said engaging means than at the other end thereof, a slidable sleeve disposed within said tubular member, said slidable sleeve being proportioned to fit snugly within that portion of said tubular member having the smallest dimension and to provide an annular passageway with that portion of said tubular member having the largest dimension, a cylindrical cap member closed at one end and adapted to circumscribe the smaller of said ends of said tubular member in slidable relationship, means for fixing said cap member to said sleeve, a port member affixed to the lower end of said sleeve, said port member being of such external dimensions as to fit snugly within said larger portion of said tubular member when said port member is disposed therein and being provided with a hole communicating between said tubular sleeve and the atmosphere, the tubular sleeve being provided in addition with a pair of diametrically opposite ports adjacent the point of union of an inlet means to said tubular member and a vent means adjoining said tubular member at a point directly beneath the inlet tube and adapted to communicate with the annular space between said sleeve and the larger portion of said tubular member.

7. A fluid nozzle adapted to be fitted to an opening in a receptacle to be filled, said nozzle comprising a passageway for fluid to be introduced to said receptacle, an associated but separate passageway for fluid to be withdrawn from said receptacle, inlet means in association with the first of said passageways to introduce fluid thereto, outlet means in association with the second of said passageways to withdraw fluid therefrom and means for simultaneously shutting off the flow of fluid through each of said passageways, said last-named means comprising a reciprocating cap member affixed to an internal retractable sleeve separating said passageways from each other, whereby said internal retractable sleeve may be raised or lowered within said nozzle to control the fluid flow from said inlet means and from said outlet means.

CARSON E. HAWK.
KENNETH J. WALKER.

REFERENCES CITED

The following references are of record in the file of this patent:

FOREIGN PATENTS

| Number | Country | Date |
| --- | --- | --- |
| 487,827 | Germany | Nov. 28, 1929 |
| 427,441 | France | Aug. 3, 1911 |